United States Patent

[11] 3,626,902

| [72] | Inventor | John B. Orfei<br>N. Revere, Mass. |
|---|---|---|
| [21] | Appl. No. | 883,041 |
| [22] | Filed | Dec. 8, 1969 |
| [45] | Patented | Dec. 14, 1971 |
| [73] | Assignee | American Science and Engineering Inc.<br>Cambridge, Mass. |

[54] EDUCATIONAL OBSERVATORY
14 Claims, 5 Drawing Figs.

| [52] | U.S. Cl. | 119/15, 119/17 |
|---|---|---|
| [51] | Int. Cl. | A01k 1/00 |
| [50] | Field of Search | 119/1, 15, 17; 43/110, 134; 222/511 |

[56] References Cited
UNITED STATES PATENTS

| 2,626,089 | 1/1953 | Osfar | 222/511 |
| 3,494,067 | 2/1970 | Potrzuski | 43/134 |

Primary Examiner—Hugh R. Chamblee
Attorney—Charles Hieken

ABSTRACT: A multiple-purpose educational device which may be used to observe or breed insects and the like. The device includes a detachable base and transparent cover which are sealed in normal use to define a cagelike enclosure. The base has an orifice for access to the interior of the device. A specially constructed slide is mounted to the base and cooperates with the orifice to open or close the orifice to permit insects, food or other material to be introduced into the device while maintaining a seal from the surrounding environment.

INVENTOR
JOHN B. ORFEI

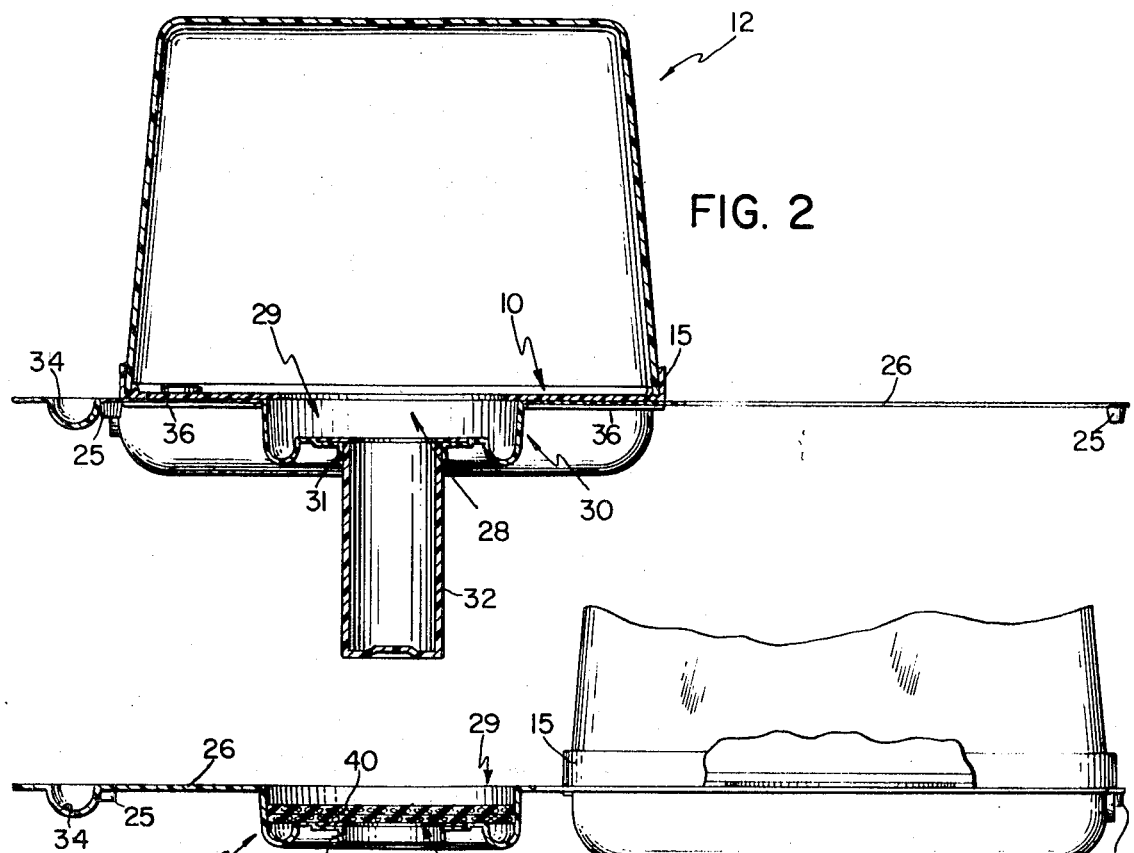
FIG. 2
FIG. 3
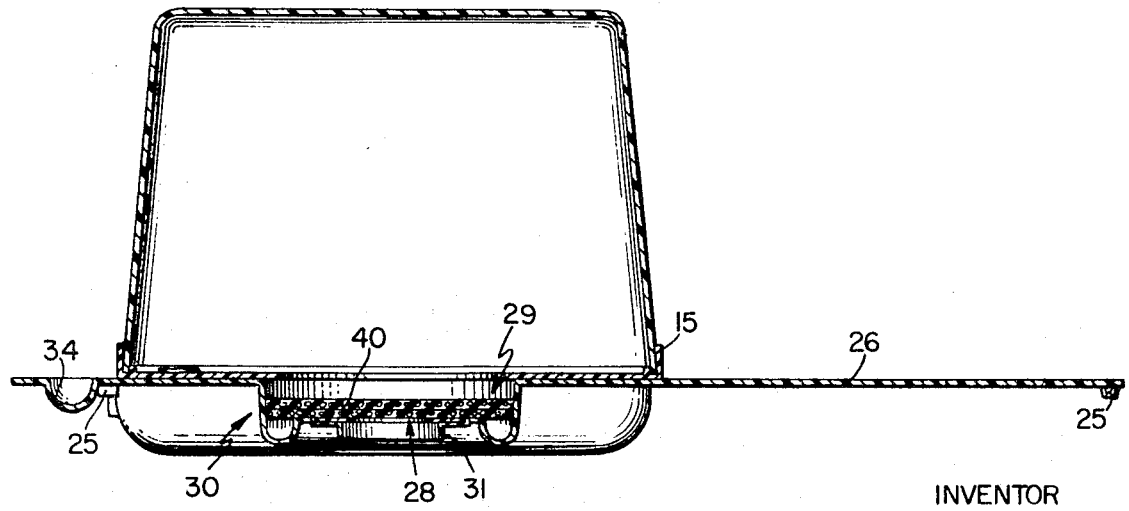
FIG. 4
INVENTOR
JOHN B. ORFEI
BY
Wolf, Greenfield, Hieken & Sacks
ATTORNEYS

EDUCATIONAL OBSERVATORY

BACKGROUND OF THE INVENTION

The present invention relates to educational and research devices or aids and, in particular, to an observatory or breeding chamber for insects or other similar small living things. The device may be employed to isolate insects or other subjects from the environment. It permits access to the interior for feeding, sampling or other purposes. The device may be employed simply to observe living and feeding habits and life cycles of insects, fish and other living things.

The chamber is highly versatile. Although described herein as an observatory or breeding chamber for insects, it may be employed for any number of uses, limited only by the ingenuity of the user. For example, it may be inverted and employed as a fish bowl. Accordingly, the chamber is most useful in an educational environment such as a classroom or laboratory.

SUMMARY OF THE INVENTION

In brief, the invention is directed to a chamber defined by a somewhat flat base and a boxlike transparent cover which is mateable with the base and normally is sealed thereto. The base includes a central orifice for controlled access to the interior of the chamber. A slide is mounted underneath the base and includes a depression with a hole formed through the slide in the region of the depression. The slide may be positioned alternatively to block the orifice and seal the chamber or to register the hole and depression with the orifice, thus providing access to the chamber. When the hole in the slide is in registry with the orifice, a vial containing insects may be uncapped and quickly registered with the hole in the slide so that the insects may enter into the chamber. When all the insects are in the chamber, the slide is shifted to cover the orifice and confine the insects.

Food or other material may be introduced into the chamber on a tray which is placed within the depressed region of the slide. The tray covers the hole in the slide and also supports the material introduced. When the tray and material have been loaded into the depression, the slide is shifted to register the depression and tray with the orifice in the base. The tray seals the hole in the slide from the environment.

It is among the objects of the invention to provide an insect observatory of simple construction which may be fabricated at low cost from readily available material such as plastic. Additionally, the device is easy to use and may be used by young grade school children.

Also among the objects of the invention is to provide a device of the character described displaying a wide versatility. Although the device is described as an insect observatory, it may be employed for many other purposes in which the features of environmental isolation, observability and access are desired.

Other objects and advantages of the invention will be apparent from the following detailed description with reference to the accompanying drawings wherein:

BRIEF DESCRIPTION OF THE DRAWINGS

FIG. 2 is a sectional view taken through the device and illustrating the position of the slide when introducing insects and the like into the enclosure;

FIG. 3 is a view similar to FIG. 2 and illustrating the position of the slide when receiving food while maintaining the enclosure in a sealed condition;

FIG. 4 is a view similar to FIG. 2 and 3 and illustrating the position of the slide when feeding insects in the enclosure while sealing the enclosure from the environment.

DETAILED DESCRIPTION OF PREFERRED EMBODIMENTS

Figure 1:
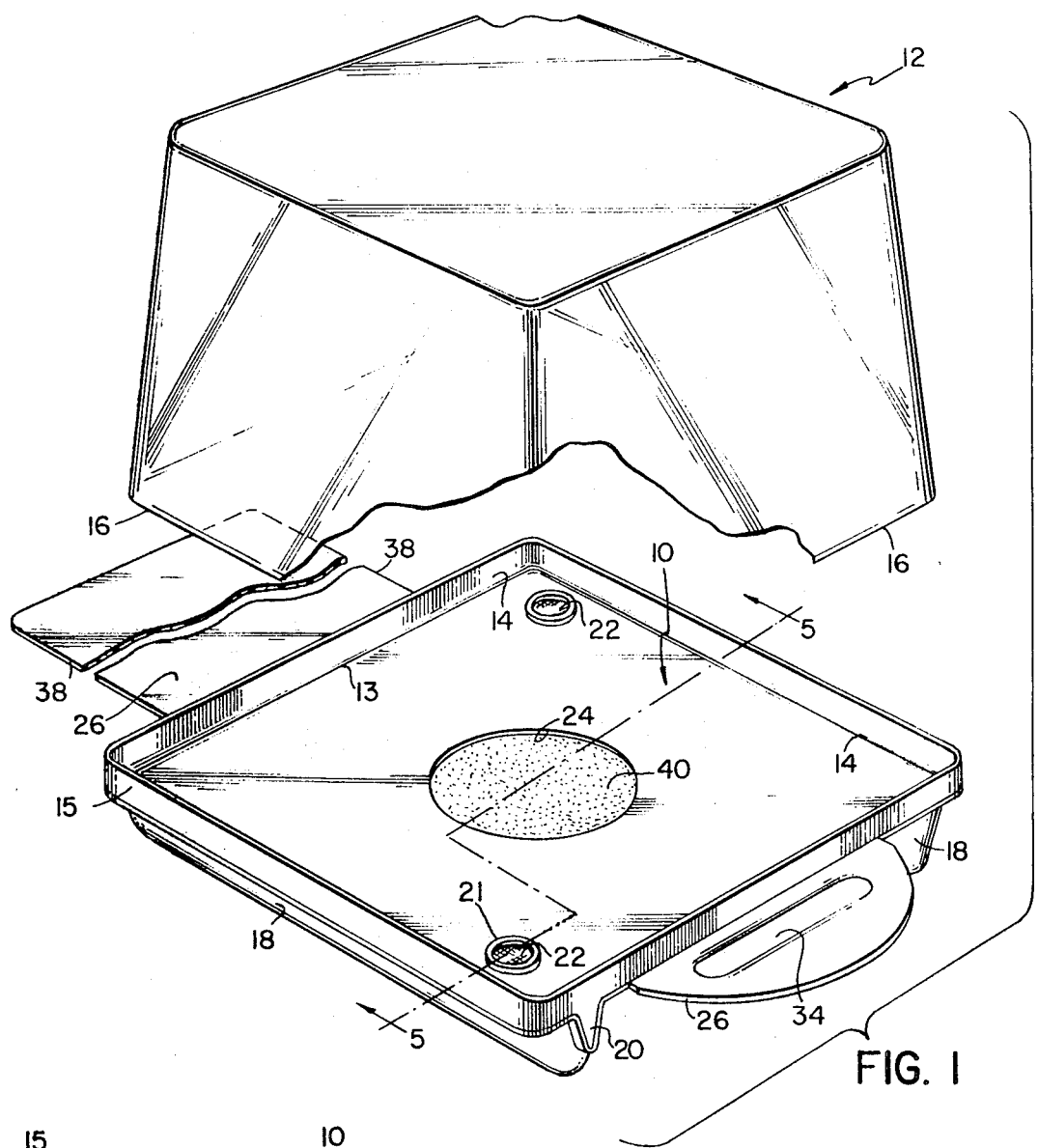
FIG. 1 is an overall view of the invention with the base and cover separated for clarification.

FIG. 1 shows the device which is described herein as an insect observatory. The device includes a base 10 of generally flat configuration and a mateable cover 12. The base 10 and cover 12 can be fabricated from readily available low-cost plastic material which may be formed to the desired shape by inexpensive and well-known molding procedures.

The base 10 and cover 12 are sealed, when mated, by a channel 14 formed integrally with the base and which opens upwardly from about the periphery of the base 10. The channel 14 is defined by inner and outer circumferential ribs 13, 15. The free edge 16 of the cover 12 fits closely between the ribs 13, 15 and within the channel 14, these parts being dimensioned to assure a snug, sealing fit. When employed as an observatory the cover 12, or at least a substantial portion thereof, is transparent.

The base 10 includes formed hollow feet 18 which are spaced and may extend along the underside of the base 10. The hollow feet 18 may be formed integrally with the base 10 or, as shown, may comprise a separately formed part which is secured firmly to the base by means of rivets 19, adhesive or the like. The hollow feet 18 may be employed to communicate air to the chamber simply by forming a hole 20 in the feet 18 and placing a fine screen 22 in the base and in communication with the hollow of the feet 18. The screen 22 may be mounted within a plug 21 which, in turn, fits closely within a receptive hole 23 formed in the base 10. The screen 22 should be of a fine mesh to permit free flow of air to the insects for life support, but should not be large enough to permit the insects to escape from the chamber. Preferably, two such screens are provided at opposite ends of the chamber to promote circulation.

Access to the interior of the chamber is provided by enlarged orifice 24 formed centrally within the base 10 (See FIG. 2–5). The orifice 24 may be opened or closed to the environment by a shutter arrangement which may consist of a slide 26 having a hole 28 formed therein which can be shifted into and out of registry with the enlarged orifice 24 in the base 10 as the slide 26 is moved. In the illustrative embodiment the hole 28 is formed centrally within a depressed portion 20 of the slide 26. The depressed portion defines a pocket 29 which functions in a manner described in more detail below. The pocket 29 and slide 26 are formed integrally from a single sheet of plastic material. The hole 28 is defined and is surrounded by a downwardly extending collar 21 formed integrally with the slide. The upper end of the hole 28 is restricted partly by a ring or washer 33 having a reduced central opening 35 which defines a shoulder 37 in the upper end of the hole 28. The washer 33 may be secured in the depression 30 by cement.

As shown in FIGS. 2, 3, and 4, the slide may be shifted between a position in which its hole 28 is in or out of registry with the orifice 24. The positions of the slide may be limited by integral stops 25 at the ends of the slide 26 which engage the outer edge of the base 10. When in the position shown in FIG. 2, the chamber may be loaded with insects contained, for example, in a vial 32. The vial 32 normally would be capped until the moment at which the insects are to be transferred to the chamber. At that time the vial is uncapped and quickly brought into registry with the hole 28 from beneath the slide. The mouth of the vial 32 is dimensioned to fit snugly within the collar 31 with the insertion of the vial 32 being limited by engagement of its mouth with the shoulder 37 defined by the washer 33. By fitting the mouth of the vial 32 closely with the hole 28, a seal is provided to reduce the likelihood of any insects escaping as they migrate into the chamber. The insects then are transferred into the chamber. When the user is satisfied that all the insects have migrated into the chamber, he quickly draws the slide to the position shown in FIG. 3 which seals the orifice 24 and isolates the insects within the chamber. In the preferred embodiment of the invention, the slide 26 includes a handle 34 which may be formed simply and integrally with the slide 26 to facilitate gripping of the slide. It may be noted further that the slide may be urged to the sealed position shown in FIG. 3 by maintaining the vial 32 in the snug fit with the collar 31 and urging the vial to the left, as seen in FIG. 2. The firm engagement of the mouth of the vial 32 with the collar 31 causes the slide to be urged to the sealed position.

Figure 5:
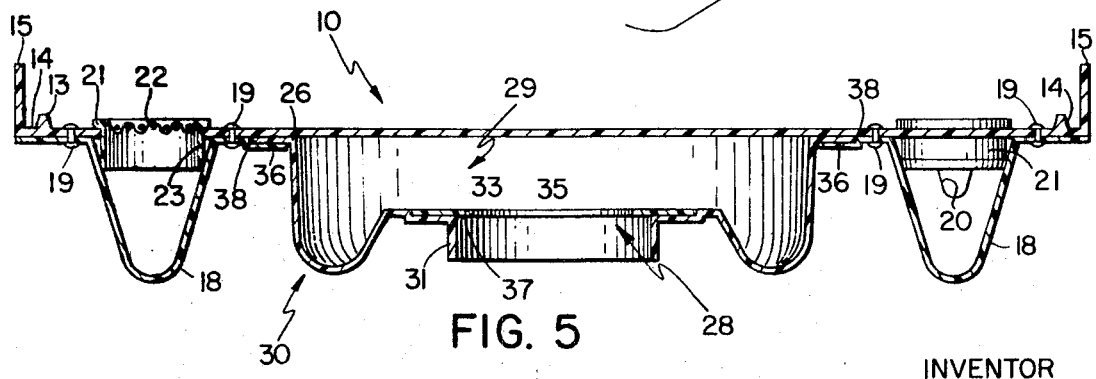
FIG. 5 is a sectional view through the base as seen from the plane 5—5 of FIG. 1.

The slide is mounted for linear sliding movement to the underside of the base 10 by means of channel members 36 located on opposite sides of the enlarged orifice 24 and in parallel relation to the elongate hollow feet 18. The channel members 36 may be formed integrally with the feet 18 which are attached as by rivets 19 to the underside of the base 10, as shown in FIG. 5. The parallel edges 38 of the slide 26 are retained within the channel member 36 for sliding movement. The channel members 36 are effective, however, to maintain the slide 26 in flush abutment with the underside of the base 10 to insure a proper seal at all times.

Once the insects have been transferred to the chamber and the slide 26 has been drawn to its sealing position shown in FIG. 3, the depressed region 30 of the slide is disposed outwardly beyond the edge of the base 10. The exposed pocket 29 then is receptive to a tray 40 which fits snugly within the pocket 29 and covers the hole 28 in the slide. The tray may be fabricated from a simple sheet of plastic or, as shown, from a thin flexible sheet of plastic foam. The foam material is preferred in that it may be pressed snugly to engagement to the slide about the hole 28 to insure an adequate seal. The tray should not extend above the level of the upper surface of the slide 26 so as not to interfere with the underside of the base 10.

When the tray has been placed in the depression 30, it may be loaded with food such as, for example, pieces of fruit for fruit flies. The slide then is returned to the position shown in FIG. 4 to expose the tray 40 and food 42 to the flies in the chamber through the enlarged orifice 24. The flies cannot escape through the hole 28 which is covered by the tray 40.

As described earlier, the invention is quite versatile. For example, the chamber may be inverted so that it rests on the cover 12. In this configuration it can serve as a fish or goldfish tank with access through the orifice 24 being controlled by the slide 26.

Additionally, although the invention has been described as an observatory, there may be instances in which it is desirable to isolate a colony of the insects or other subjects from light and, for this purpose, the base 10 and cover 12 may be formed of opaque plastic.

It should be understood that the foregoing description is intended merely to be illustrative of the invention and that other embodiments and modifications thereof will be apparent to those skilled in the art without departing from its spirit. For example, although the shutter arrangement for controlling the access through the orifice 24 has been described as a linearly movable slide, other shutter arrangements having appropriately formed holes and depressions or pockets may be substituted. Indeed, in some instances it may be desirable to provide the depression 30 and hole 28 on different portions of the shutter with a third portion of the shutter serving as a seal. In this case the shutter should be movable to present any desired portion thereof to the enlarged orifice in the base.

Having thus described the invention what is claimed is:
1. A cagelike enclosure for living things comprising:
wall means defining said enclosure for isolating completely the interior of said enclosure, said wall means having an orifice formed therein for communication between the interior and exterior of said enclosure;
shutter means having a hole formed therein;
means mounting said shutter means to said wall means for movement between positions in which said shutter means covers said orifice or exposes said orifice through said shutter hole; and
a vent in said wall means, said vent being adapted to communicate air to the said chamber but to preclude an insect from passing therethrough,
said shutter means comprising a slide mounted to said wall means for linear sliding movement therealong, and along a path in which said shutter hole is registerable with said orifice,
said slide being elongate in shape and having parallel opposed edges with said means mounting said slide to said wall means comprising,
a pair of parallel channels secured to the exterior surface of said wall means on opposite sides of said orifice in said wall means,
said parallel edges of said slide being retained slidably in said channels,
said channels being dimensioned to maintain said slide in flush abutment against the exterior surface of said wall means,
means for limiting the movement of said slide between a first position in which said hole and orifice are in registry with each other and a second position wherein the remainder of said slide blocks and seals said orifice,
and a flange secured to the underside of said slide and depending therefrom,
said flange circumscribing and defining said shutter hole and being receptive to the mouth of a vial,
the inner end of said collar terminating in a flange and adapted to restrict the degree of insertion of said vial into said collar,
said flange and said collar cooperating with the mouth of said vial to effect a seal therebetween.
2. An enclosure as defined in claim 1 wherein said wall means comprises:
a base;
a removable cover mateable with said base in sealing relation thereto to define said enclosed chamber; and
means mounting said shutter means to the underside of said base, said orifice being formed in said base.
3. An apparatus as defined in claim 2 wherein said base is of substantially flat configuration and wherein said cover is of a boxlike configuration having an opening mateable with said base.
4. A cagelike enclosure for living things comprising:
wall means defining said enclosure for isolating completely the interior of said enclosure, said wall means having an orifice formed therein for communication between the interior and exterior of said enclosure;
shutter means having a hole formed therein;
means mounting said shutter means to said wall means for movement between positions in which said shutter means covers said orifice or exposes said orifice through said shutter hole; and
a vent in said wall means, said vent being adapted to communicate air to the said chamber but to preclude an insect from passing therethrough,
said shutter means comprising a slide mounted to said wall means for linear sliding movement therealong, and along a path in which said shutter hole is registrable with said orifice,
said slide being elongate in shape and having parallel opposed edges with said means mounting said slide to said wall means comprising,
a pair of parallel channels secured to the exterior surface of said wall means on opposite sides of said orifice in said wall means,
said parallel edges of said slide being retained slidably in said channels,
said channels being dimensioned to maintain said slide in flush abutment against the exterior surface of said wall means,
means for limiting the movement of said slide between a first position in which said hole and orifice are in registry with each other and a second position wherein the remainder of said slide blocks and seals said orifice, said slide further comprising, means defining an enlarged depression in that surface of said slide which bears against said wall means, said hole being formed in said depressed portion of said slide, said slide and depression being arranged so that when in said second position, said depressed portion of said slide protrudes beyond said wall means to provide access to said depression, said depression being receptive to a tray when said slide is in said second position, said tray being adapted to cover said hole in said slide whereby when said slide is returned to said first position, said tray is exposed to the interior of said container and said hole in said slide is blocked whereby material may be introduced on said tray into the interior of said container while maintaining effective seal from the atmosphere.

5. A cagelike enclosure for living things comprising:

wall means defining said enclosure for isolating completely the interior of said enclosure, said wall means having an orifice formed therein for communication between the interior and exterior of said enclosure;

shutter means having a hole formed therein;

means mounting said shutter means to said wall means for movement between positions in which shutter means covers said orifice or exposes said orifice through said shutter hole; and a vent in said wall means, said vent being adapted to communicate air to the said chamber but to preclude an insect from passing therethrough, said shutter means bearing against said wall means and is mounted for movement between a first position in which said hole and orifice are in registry and a second position wherein the remainder of said shutter means blocks and seals said orifice, said shutter means further comprising:

means defining an enlarged depression in that surface of said shutter which bears against said wall means, said hole being formed in said depressed portion of said shutter, said shutter and depression being arranged so that when in said second position, said depressed portion of said shutter protrudes beyond said wall means to provide access to said depression, said depression being receptive to a tray when said shutter is in said second position, said tray being adapted to cover said hole in said shutter whereby when said shutter is returned to said first position, said tray is exposed to the interior of said container and said hole in said shutter is blocked whereby material may be introduced on said tray into the interior of said container while maintaining effective seal from the environment.

6. A cagelike enclosure for living things comprising:

wall means defining said enclosure for isolating completely the interior of said enclosure, said wall means having an orifice formed therein for communication between the interior and exterior of said enclosure;

shutter means having a hole formed therein;

means mounting said shutter means to said wall means for movement between positions in which said shutter means covers said orifice or exposes said orifice through said shutter hole; and a vent in said wall means, said vent being adapted to communicate air to the said chamber but to preclude an insect from passing therethrough, said wall means comprising;

a base, a removable cover matable with said base in sealing relation thereto to define said enclosed chamber, means mounting said shutter means to the underside of said base, said orifice being formed in said base, a collar formed at the underside of said shutter means and circumscribing said hole, said collar being receptive to the mouth of a vial; and a flange secured to said shutter at the innermost end of said collar and presenting a restriction to further insertion of the mouth of said vial into said collar, said flange and vial being cooperative to define a seal therebetween when said vial is mated therewith.

7. A cagelike enclosure for living things comprising:

wall means defining said enclosure for isolating completely the interior of said enclosure, said wall means having an orifice formed therein for communication between the interior and exterior of said enclosure;

shutter means having a hole formed therein;

means mounting said shutter means to said wall means for movement between positions in which said shutter means covers said orifice or exposes said orifice through said shutter hole; and a vent in said wall means, said vent being adapted to communicate air to the said chamber but to preclude an insect from passing therethrough, said wall means comprising, a base, a removable cover matable with said base in sealing relation thereto to define said enclosed chamber, and means mounting said shutter means to the underside of said base, said orifice being formed in said base, said shutter being movable between a first position in which said hole and orifice are in registry and a second position in which the remainder of said shutter blocks and seals said orifice, said shutter further comprising;

means defining an enlarged depression in that surface of said shutter which bears against said base, said hole being formed in said depressed portion of said shutter, said shutter and depression being arranged so that when said shutter is in said second position said depressed portion of said shutter protrudes beyond the edge of said base to provide access to said depression, said depression being receptive to a tray adapted to cover said hole in said shutter whereby when said shutter is returned to said first position said tray is exposed to the interior of said container and said hole in said shutter is blocked whereby material may be introduced to the interior of said container while maintaining a sealed relation to the atmosphere.

8. An apparatus as defined in claim 7 wherein said shutter comprises:

a slide mounted to the underside of said base for linear sliding movement therealong and along a path in which said hole and said depressed portion are registerable with said orifice.

9. An apparatus as defined in claim 8 wherein said slide is of elongate configuration and has a pair of opposed parallel edges and wherein said means mounting said slide to said base comprises:

a pair of parallel channels secured to the underside of said base on opposite sides of said orifice, said parallel edges of said slide being retained slideably within said channels, said channels being dimensioned to maintain said slide in flush abutment against the underside of said base.

10. A cagelike enclosure for living things comprising:

wall means defining said enclosure for isolating completely the interior of said enclosure, said wall means having an orifice formed therein for communication between the interior and exterior of said enclosure;

shutter means having a hole formed therein;

means mounting said shutter means to said wall means for movement between positions in which said shutter means covers said orifice or exposes said orifice through said shutter hole; and a vent in said wall means, said vent being adapted to communicate air to the said chamber but to preclude an insect from passing therethrough, said wall means comprising:

a generally flat base having a continuous upwardly opening channel formed about its peripheral margin;

a boxlike cover having an open face defined by a continuous edge, said cover and base being matable with said edge of said cover being received within said channel to effect a seal therebetween;

and wherein said shutter means comprises:

a slide mounted to the underside of said base for linear sliding movement along a path in which said hole in said slide is registrable with said orifice;

means for limiting the movement of said slide between a first position in which said hole and orifice are in registry and a second position wherein the remainder of said slide locks and seals said orifice, said slide further comprising:

means defining an enlarged depression in that surface of said slide that bears against the underside of said base, said hole being formed in said depressed portion of said slide, said slide and depression being arranged so that when said slide is in said second position, said depressed portion of said slide extends beyond the edge of said base to provide access to said depression, said depression being receptive to a tray when in said second position, said tray being adapted to cover said hole in the slide whereby when said slide is returned to said first position said tray is exposed to the interior of said container and said hole in said slide is blocked whereby material may be introduced on said tray to the interior of said container while retaining an effective seal from the atmosphere.

11. An apparatus as defined in claim 10 wherein said cover is transparent to permit visual inspection of living things within said container.

12. An apparatus as defined in claim 10 further comprising:

said base having hollow supporting feet formed integrally therewith at the underside thereof, said feet extending downwardly beyond the level of said depression formed in said slide.

13. An apparatus as defined in claim 12 wherein at least one of said feet is open to the atmosphere and wherein said vent is interposed between said opening and said feet and the interior of said chamber.

14. An apparatus as defined in claim 13 wherein said vent comprises a fine mesh material.

* * * * *